United States Patent [19]

Mueller et al.

[11] Patent Number: 4,993,688
[45] Date of Patent: Feb. 19, 1991

[54] BUILT-IN POWER JACK

[76] Inventors: Thomas L. Mueller; Pamela A. Mueller, both of P.O. Box 69, Germantown, Ill. 62245

[21] Appl. No.: 419,505
[22] Filed: Oct. 10, 1989
[51] Int. Cl.⁵ .............................. B66F 3/24
[52] U.S. Cl. .................................. 254/423
[58] Field of Search ............ 254/423, 418, 93 H, 254/93 R

[56] References Cited

U.S. PATENT DOCUMENTS

| | | |
|---|---|---|
| 1,719,740 | 7/1929 | Williams . |
| 1,957,151 | 5/1934 | Pollard . |
| 1,983,444 | 12/1934 | Dry ............................ 254/423 |
| 2,047,934 | 7/1936 | Baethge . |
| 2,080,711 | 5/1937 | Haraldson . |
| 2,343,937 | 3/1944 | Smith . |
| 2,444,272 | 6/1948 | Sragal . |
| 2,472,294 | 6/1949 | Hall . |
| 2,473,757 | 6/1949 | Long . |
| 2,499,072 | 2/1950 | McClure . |
| 2,619,319 | 11/1952 | Lucas . |
| 2,764,249 | 9/1956 | Paolucci ....................... 254/423 |
| 3,064,994 | 11/1962 | Limmer . |
| 3,186,686 | 6/1965 | Mayer . |
| 4,061,309 | 12/1977 | Hanser . |
| 4,150,813 | 9/1979 | Mena . |
| 4,174,094 | 11/1979 | Valespino et al. . |
| 4,597,584 | 7/1986 | Hanser . |
| 4,746,133 | 5/1988 | Hanser et al. . |

Primary Examiner—Robert C. Watson
Attorney, Agent, or Firm—Andsel Group, Inc.

[57] ABSTRACT

An automobile pneumatic jack system that can be easily attached to all currently manufactured automobile chassis and frames. There is a front suspension pneumatic jack that is mounted centrally to the front suspension of an automobile between its front wheels. There is also a rear suspension pneumatic jack that is mounted centrally to the rear suspension of the automobile between its rear wheels. The system operates from a compressed air reservoir tank that has connections for the front and rear car jack outlets. Additional outlets can be added to the compressed air reservoir tank for connecting a pneumatic lug wrench and another for a tire inflating hose. A further option to the system could include a connection to the master brake cylinder such that when the car is locked, the compressed air is applied to the braking system to lock the brakes hard on for an anti-theft feature.

1 Claim, 1 Drawing Sheet

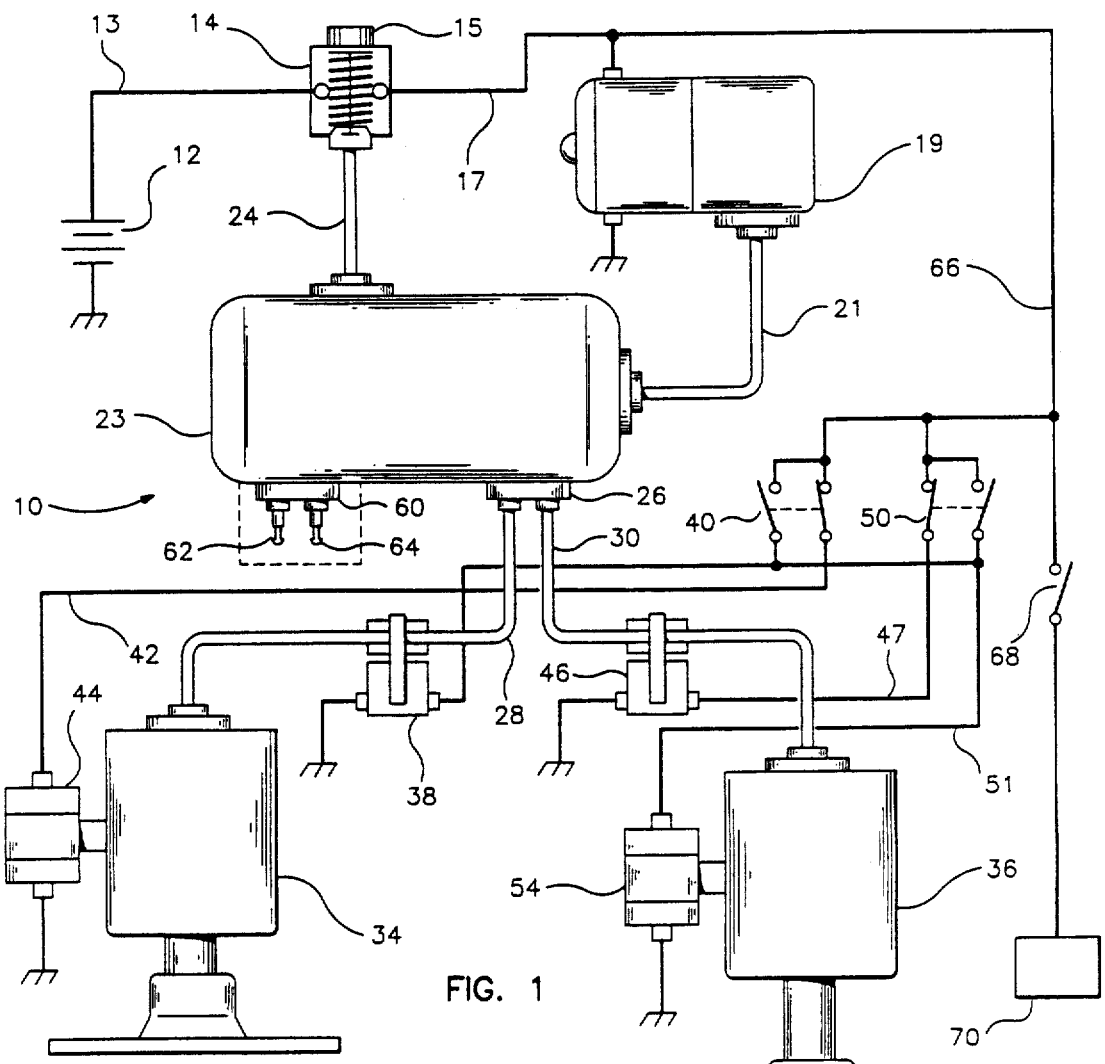
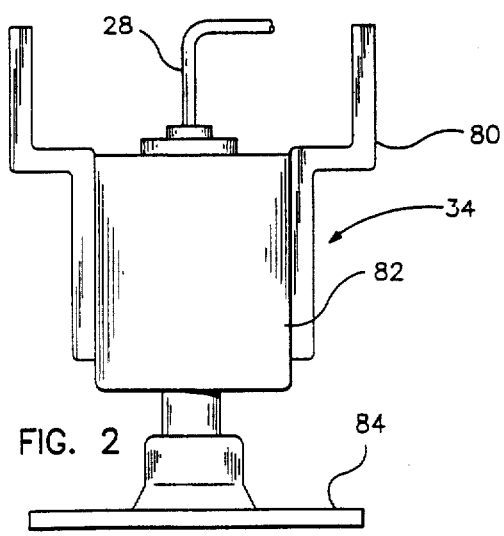
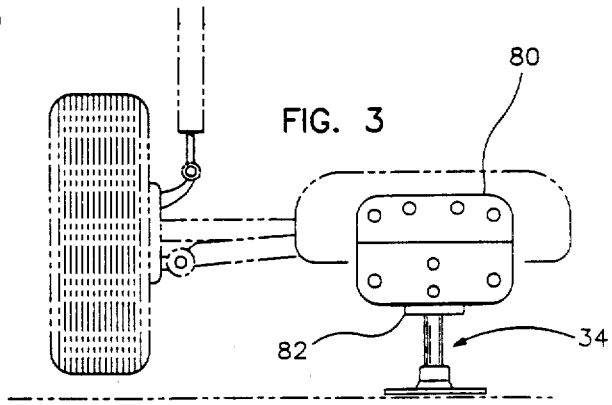

BUILT-IN POWER JACK

BACKGROUND OF THE INVENTION

The invention relates to pneumatic jacks and more specifically to an automobile pneumatic jack system.

In the past, both hydraulic and pneumatic jacks have been utilized in combination with the structure of an automobile. They have always utilized a separate jack for each of the four wheels of the vehicle.

By having the jacks permanently installed on the vehicle they are ready for operation at all times.

A representative prior art patent in that U.S. Pat. No. 1,168,906, which is a screw-type jack, see FIG. 2. Lifting devices have been installed on vehicles, such as the air spring lift device of U.S. Pat. No., 3,064,994. Additionally, various types of jacks or lift devices have been installed on vehicles which are turned in one fashion or another from a horizontal attitude into a vertical attitude and then extended for the purpose of lifting the vehicle, see, for example, U.S. Pat. Nos., 2,233,732; 2,237,167; 2,442,881; and 3,288,436; these may be referred to as the tilt and lift type. Finally, U.S. Pat. No., 2,162,931, is for a lifting jack of a pneumatic type which is mounted to the wheel zone and which extends vertically.

It is an object of the invention to provide a novel pneumatic jack system that only utilizes two pneumatic jacks, one that would be mounted centrally to the front suspension of an automobile between its front wheels and a second pneumatic jack that would be mounted centrally to the rear suspension of the automobile between its rear wheels.

It is also an object of the invention to provide a novel pneumatic jack system that can be operated by the driver from inside the car.

It is another object of the invention to provide a novel pneumatic jack system that has an air reservoir tank having auxiliary outlet connectors for the pneumatic lug wrench, and also for a tire inflation hose.

It is a further object of the invention to provide a novel automobile pneumatic jack system that may include a connection to a master brake cylinder of the automobile such that when the car is locked, the compressed air is applied to the braking system to lock the brakes in the hard-on position for an anti-theft feature.

SUMMARY OF THE INVENTION

Applicant's novel pneumatic jack system has been designed to provide a built-in powered jack system for an automobile. It is a complete add-on pneumatic service system that would have a front jack attached to the front suspension of an automobile between its front wheels. It would also have a rear jack attached to the rear suspension of the automobile between its rear wheels. The system operates from a compressed air reservoir tank that has connections for the front and rear car jack outlets. The controls for the front and rear jacks would be located in the vehicle on its dash. The system includes an electric compressor pump for automatically filling the air reservoir tank as the air pressure is being utilized. An automatic regulator switch would keep the air reservoir tank always at an operating level.

Additional outlets could be included for the air reservoir tank so that a pneumatic lug wrench could be attached thereto and an additional outlet could be utilized as an air source to fill tires. A further option to the system would include a connection to the master brake cylinder such that when the car is locked, the compressed air is applied to the braking system to lock the brakes hard on for an anti-theft feature.

The jack system is unique from prior art by the use of only one jack for each wheel axis. The system is more stable by the fact that the forces on a singular jack that is placed in the center will have all forces directed downwards or vertical. With conventional jacks that support the load only on one of four sides, when one jack is higher than the other, the other three have a sideward or horizontal force that is dangerous and could cause the jack to sway and fall off the car.

The novel automobile pneumatic jack system also allows for its attachment to cars with independent front and rear suspension systems. This is critical since most cars are designed with these. These systems have a center pivot in the center of the wheel axle that is where the jack is mounted. The center point is engineered to support the car weight, and act as the pivot point for each wheel suspension system. Each of the jacks have a bottom platform that distributes the car weight, adds stability, and allows the jack to be useful on areas other than hard surfaced roadways.

The theory of operation of applicant's novel automobile pneumatic jack system will now be described. The automobile pneumatic powered jack system consists of a tank of compressed air that has a sufficient volume to supply a 50 psi (pounds per square inch) source to perform the system functions. An electric operated air compressor that is controlled in a feed back loop with an automatic regulator switch starts or stops the air compressor if the tank has reached the preset psi value. Two air outlets from a 50 psi regulator if the air reservoir is a high psi type such as a 100 psi tank. These two outlets have their air controlled with an on/off solenoid electric operated valve. The electric switch inside the automobile allows simple wiring and ease of connection over previous designs that require complex plumbing systems to be routed up into the dash panel. The electric solenoids are easily attached to the air tube that connects to both the front and rear jacks air input source. When the electric solenoid is activated, the air is not restricted and the air pressure is sent to the pneumatic jacks that begin to extend. The jacks have another solenoid valve to release the pressure and lower the jack. The electric solenoid valves require voltage connection to open the flow of air to the jack. This is a safety feature such that if power is lost when the jack is lifting the car, the air supply is cut off, but the pressure will still remain to the jack, and support the car. When the jack is to be lowered, another electirc solenoid valve must be activated with positive voltage to open the jack escape air line and let the jack lower slowly.

The air reservoir must be adequate to lift the two jacks and support auxiliary options for the external air lug wrench and air source are installed, then also supply air for ten minutes to the lug wrench and to fill four standard tubeless tires to 35 psi. The tank physical size can be reduced to extremely small, but the internal pressure of the tank must be be very strong. However modern aluminum tanks are light weight and are extremely small and they would meet this requirement.

DESCRIPTION OF THE DRAWINGS

FIG. 1 is a schematic illustration of the novel automobile pneumatic jack system;

FIG. 2 is a side elevation view of one of the pneumatic jacks illustrating its mounting brakcets; and FIG. 3 is a schematic illustration showing one of the pneumatic jacks mounted on the the front suspension of an automobile between its front wheels.

DESCRIPTION OF THE PREFERRED EMBODIMENT

Applicant's novel automobile pneumatic jack system will now be described by referring to FIGS. 1–3 of the drawings. The automobile pneumatic jack system is generally designated numeral 10.

System 10 has a 12 volt DC battery connected by electrical wire 13 to automatic regulator switch 14. A knob 15 allows for adjustment of the psi. An electrical wire 17 is connected to electric compressor pump 19. Exiting pump 19 is a high pressure line 21 that is connected to air reservoir tank 23. A high pressure line 24 connects automatic regulator switch 14 with air reservoir tank 23.

A primary 50 psi regulator 26 is connected to air reservoir tank 23 and it has air hose lines 28 and 30 extending therefrom. Air hose line 28 is connected to front suspension pneumatic jack 34. Air hose line 30 is connected to rear suspension pneumatic jack 36. A pressure on/off solenoid valve 38 is located in air hose line 28 and it is connected by electrical wire 39 to a switch control 40 mounted in the interior of the vehicle on its dash. An electrical wire 42 is also connected to switch 40 and also release on/off solenoid valve 44. Movement of switch 40 in one direction releases compressed air into jack 34 causing it to be extended. Movement of switch 40 in its opposite direction causes the compressed high pressure air in jack 34 to be released therefrom. Jack 36 has a similar pressure on/off solenoid valve 46 that is connected by electrical wire 47 to switch 50. An electrical wire 51 extends from switch 50 to release on/off solenoid valve 54. Switch 50 operates in the same fashion as that described for switch 40.

An auxiliary 50 psi regulator 60 is also connected to air reservoir tank 23. It has a nozzle outlet for an air lug wrench and it also has a connection 64 for an air tire inflation hose.

An electrical wire 66 may also be connected to a switch 68 that is in circuit with the master brake cylinder 70 of the automobile. An air hose line 90 would be connected between the auxiliary regulator 60 and master brake cylinder 70 so that when the car is locked, the compressed air could be applied to the braking system to lock the brakes in a hard on position for antitheft purposes.

In FIG. 2, front suspension pneumatic jack 34 is shown with its mounting bracket 80 attached thereto. Jack 34 has a housing 82 and a bottom platform 84.

In FIG. 3, front suspension pneumatic jack 34 is illustrated attached to the front suspension of a vehicle. In this view the jack is in its extended position.

What is claimed is:

1. An automobile pneumatic jack system comprising:
  a front suspension pneumatic jack and means for mounting it centrally to the front suspension of an automobile between its front wheels;
  a rear suspension pneumatic jack and means for mounting it centrally to the rear suspension of an automobile between its rear wheels;
  a compressed air reservoir tank;
  a first air hose line connected between said air reservoir tank and said front suspension pneumatic jack;
  a second air hose line connected between said air reservoir tank and said rear suspension pneumatic jack;
  a first solenoid valve means for extending said front suspension pneumatic jack to the ground and a second solenoid valve means for retracting said front suspension pneumatic jack;
  a front jack control assembly for operating said first and second solenoid valve means;
  a third solenoid valve means for extending said rear suspension pneumatic jack to the ground and a fourth solenoid valve means for retracting said rear suspension pneumatic jack;
  a rear jack control assembly for operating said third and fourth solenoid valve means; and
  means for maintaining a ready supply of compressed air in said reservoir tank.
  comprising an electric air compressor pump connected to said air reservoir tank by a high pressure line, said pump being electrically connected to the battery of an automobile;
  an auxiliary air regulator connected to said air reservoir tank, said air regulator having air outlet connectors for a pneumatic lug wrench and a tire inflation hose; and
  an adjustable automatic air regulator switch in the electrical circuit between said battery and said compressor pump;
  a third air hose line connected between said auxiliary air regulator and a brake master cylinder to provide pressure to the brake master cylinder to releasingly lock the brakes in a brake-on position; and
  a brake switching means in a brake electrical circuit of the automobile to actuate the brake master cylinder.

* * * * *